UNITED STATES PATENT OFFICE.

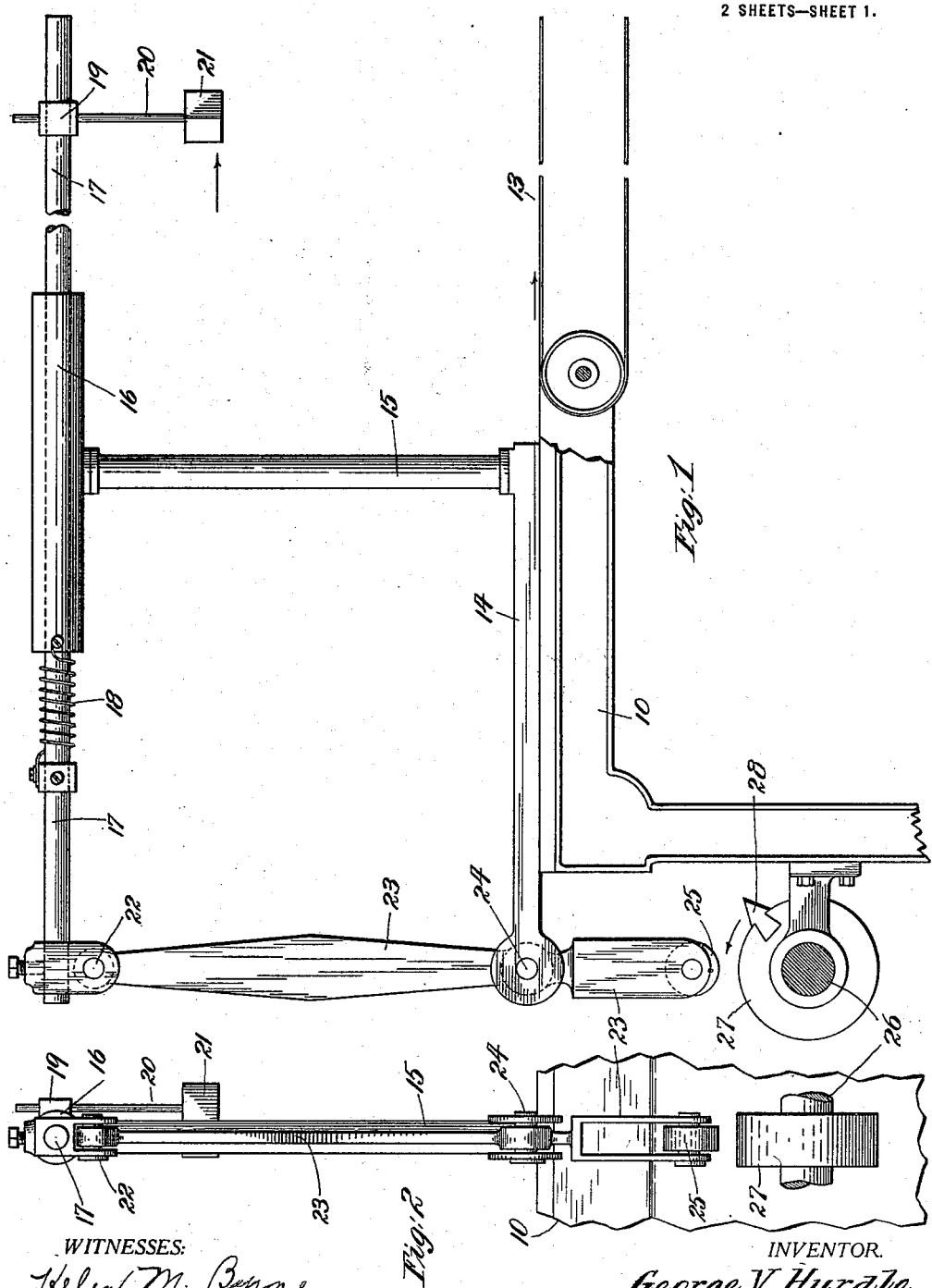

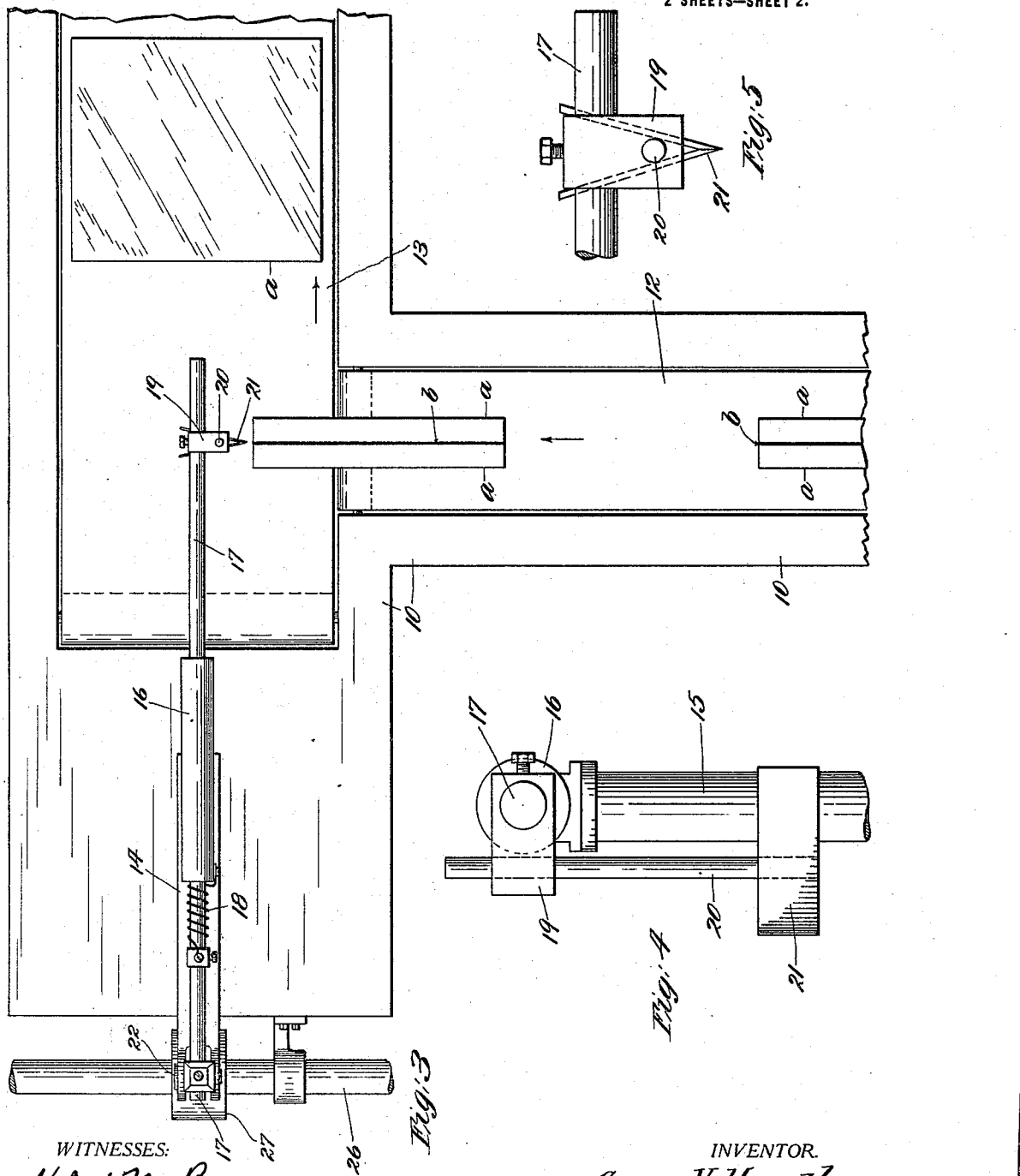

GEORGE V. HURDLE, OF PORT KENNEDY, PENNSYLVANIA, ASSIGNOR TO EHRET MAGNESIA MANUFACTURING COMPANY, OF VALLEY FORGE, PENNSYLVANIA, A CORPORATION OF PENNSYLVANIA.

APPARATUS FOR DELIVERING BLOCKS OF MAGNESIA COVERING.

1,147,096.   Specification of Letters Patent.   Patented July 20, 1915.

Application filed June 12, 1914. Serial No. 844,749.

*To all whom it may concern:*

Be it known that I, GEORGE V. HURDLE, a citizen of the United States, residing at Port Kennedy, in the county of Montgomery and State of Pennsylvania, have invented certain new and useful Apparatus for Delivering Blocks of Magnesia Covering, of which the following is a specification.

The principal object of the present invention may be said to reside in the providing of new and novel apparatus for automatically tripping and delivering properly positioned blocks of magnesia covering, after the same have been cut to desired size.

Other and further objects of the present invention reside in the providing of general details of construction and arrangement of parts as will hereinafter more fully appear.

With these and other objects in view, the invention consists of the improvements hereinafter described and finally claimed.

The nature, characteristic features and scope of the invention will be more fully understood from the following description taken in connection with the accompanying drawings forming part hereof and in which:

Figure 1, is a view in side elevation of apparatus embodying the invention. Fig. 2, is a fragmentary view in front elevation of the same. Fig. 3, is a top or plan view of Fig. 1. Fig. 4, is a fragmentary view, drawn to an enlarged scale, of a separating device hereinafter referred to, and Fig. 5, is a top or plan view of Fig. 4.

In the drawings 10, designates a table or supporting structure equipped with endless conveyers 12, and 13, which as shown in Fig. 3, are belts and are arranged at right angles to one another and so disposed that articles being carried by the conveyer 12, may be transferred to the conveyer 13, for continuous travel. Having fixed relation with the table 10, and in central alinement with the conveyer 13, is a base plate 14, rising from which is a fixed standard 15. The standard 15, carries at its top a fixed barrel 16. Movable endwise through the barrel 16, is a plunger rod 17, which is spring controlled as at 18, to insure its return to normal position after being shifted endwise. The free end of the plunger rod 17, has adjustably mounted thereon a block 19, depending from which is a vertically disposed rod 20, carrying at its lower end a horizontally disposed V-shaped separator 21, the purpose of which will presently appear. The opposite end of the plunger rod 17, has pivotal relation as at 22, with a vertically disposed tappet arm 23, fulcrumed as at 24, with the base plate 14, the free end of the tappet arm 23, being equipped with a roller 25. Below the tappet arm 23, and rotatable with the shaft 26, is a cam for operating the tappet arm, which as shown embraces a member 27, provided with a cam piece 28.

The above described apparatus has been particularly designed to meet the requirements of manufacturing blocks of magnesia covering. The blocks of magnesia covering are guided upon edge to a suitable machine (not shown in the drawings) and cut in two parts *a—a* through the instrumentality of a rotating saw and still upon edge are carried along by the conveyer 12, see Fig. 3. The blocks *a—a* are guided so that the saw kerf *b*, is in alinement with the V-shaped separator 21, carried by the free end of the plunger rod 17. Thus the blocks *a—a* when contacting with the separator 21, are slightly diverged and the parts of the apparatus are so timed that when a pair of blocks *a—a* have been diverged by the separator 21, the cam piece 28, comes in contact with the free end of the tappet arm 23, and moves to the right in Fig. 3, the plunger rod 17, which movement of the plunger rod causes the separator 21, to trip or knock over upon its flat face or side the outermost block *a*, and as the spring 18, returns the plunger rod 17, to normal position, the other block *a*, is likewise knocked over by the separator 21. Thus the pair of blocks travel with the conveyer 13, upon their sides in contradistinction from their edges and are moved to a suitable place for storage.

Heretofore it has been necessary after the blocks have been cut to have an operator manually trip or turn the blocks over upon their flat sides upon delivery of same to the conveyer 13. With the installation of the present apparatus, blocks of magnesia covering, properly cut, may be automatically separated, tripped and delivered in proper position for storage by a continuous operation which obviously is advantageous.

While the above description has been restricted to the handling of blocks of magnesia covering, obviously, the apparatus is applicable for use in the handling of other material and I do not wish by the above description to limit the invention thereby.

What I claim is:

1. In apparatus of the class described the combination of a pair of conveyers arranged at right angles to one another of which one of said conveyers is designed to present to the other, edgewise disposed abutting pairs of blocks and tripping mechanism operatively disposed in the path of travel of said blocks for causing them to assume a separated horizontal position upon the other of said conveyers.

2. In apparatus of the class described, the combination of a pair of conveyers disposed at right angles to one another, of which one is designed to present to the other, edgewise disposed abutting pairs of blocks, an endwise shiftable separator operatively disposed in the path of travel of said blocks and means for shifting the separator to trip said blocks for facewise travel upon the other of said conveyers.

3. In apparatus of the class described the combination of a pair of conveyers disposed at right angles to one another of which one is designed to present to the other, edgewise disposed abutting pairs of blocks, a spring impelled endwise shiftable separator operatively disposed in the path of travel of said blocks, a tappet arm operatively connected with said separator and means for coöperatively engaging the tappet arm for causing said separator to trip said blocks for facewise travel upon the other of said conveyers.

4. In apparatus of the class described the combination of a supporting structure, conveyers disposed at right angles to one another operative with respect to said structure; a fixed element carried by said supporting structure, an endwise shiftable spring controlled rod operative through said fixed element, one end of said rod being provided with a separator for tripping abutting pairs of blocks, and the other end of said rod having pivotal relation with a tappet arm fulcrumed to the fixed element and means for operating said tappet arm.

5. In apparatus of the class described the combination of a table, conveyers disposed at right angles to one another operative with respect to said table, an angular supporting element fixed to the table, a spring impelled endwise shiftable rod operative through said element in a plane above said conveyers, one end of said rod being provided with a V-shaped separator for tripping abutting pairs of edgewise disposed blocks and the other end of said rod having pivotal relation with a tappet arm fulcrumed to said element and means for operating the tappet arm.

6. A device for tripping edgewise disposed abutting pairs of blocks, embracing a fixed angular support provided at its top with a barrel, a spring impelled endwise shiftable plunger rod operative through said barrel, a V-shaped separator carried at one end of said rod, and a tappet arm fulcrumed to said support one end thereof having pivotal relation with said plunger rod.

7. A device for tripping edgewise disposed abutting pairs of blocks embracing a fixed angular support having fulcrumed to one end a tappet arm and having fixed to the other end a horizontally disposed barrel, a spring impelled plunger rod operative through said barrel, one end of which rod has pivotal connection with said tappet arm and a horizontally disposed V-shaped separator depending from the free end of said rod and adjustable with respect thereto.

In testimony whereof, I have hereunto signed my name in the presence of two witnesses.

GEORGE V. HURDLE.

Witnesses:
 SPENCER McK. REIFF,
 W. O. STOVER.

Copies of this patent may be obtained for five cents each, by addressing the "Commissioner of Patents, Washington, D. C."